US012601901B2

(12) United States Patent
Mittelstädt et al.

(10) Patent No.: US 12,601,901 B2
(45) Date of Patent: Apr. 14, 2026

(54) DETECTION DEVICE FOR A LASER SCANNING MICROSCOPE

(71) Applicant: ABBERIOR INSTRUMENTS GMBH, Göttingen (DE)

(72) Inventors: Haugen Mittelstädt, Bovenden (DE); Jörn Heine, Witzenhausen (DE); Matthias Reuss, Göttingen (DE); Matthias Henrich, Heidelberg (DE); Joachim Fischer, Karlsruhe (DE)

(73) Assignee: ABBERIOR INSTRUMENTS GMBH, Gottingen (DE)

( * ) Notice: Subject to any disclaimer, the term of this patent is extended or adjusted under 35 U.S.C. 154(b) by 581 days.

(21) Appl. No.: 18/160,551

(22) Filed: Jan. 27, 2023

(65) Prior Publication Data

US 2023/0176353 A1      Jun. 8, 2023

Related U.S. Application Data

(63) Continuation-in-part of application No. PCT/EP2021/071344, filed on Jul. 29, 2021.

(30) Foreign Application Priority Data

Jul. 30, 2020      (DE) ..................... 10 2020 120 114.1

(51) Int. Cl.
*G02B 21/00*      (2006.01)

(52) U.S. Cl.
CPC ..... *G02B 21/0032* (2013.01); *G02B 21/0064* (2013.01); *G02B 21/0076* (2013.01)

(58) Field of Classification Search
CPC .................................................. G02B 21/0064
See application file for complete search history.

(56) References Cited

U.S. PATENT DOCUMENTS

| | | |
|---|---|---|
| 2003/0155494 A1 | 8/2003 | Olschewski |
| 2003/0179372 A1 | 9/2003 | Knebel |
| 2003/0204379 A1 | 10/2003 | Olschewski |
| 2003/0231825 A1 | 12/2003 | Olschewski |

(Continued)

FOREIGN PATENT DOCUMENTS

| | | |
|---|---|---|
| DE | 198 35 070 A1 | 2/2000 |
| DE | 102 06 979 A1 | 8/2003 |

(Continued)

OTHER PUBLICATIONS

Chinese Examination Report for Application No. 202180060075.7 dated Sep. 13, 2025.

*Primary Examiner* — Alexander P Gross
(74) *Attorney, Agent, or Firm* — MOSER TABOADA

(57)      ABSTRACT

The invention relates to a detection device (2) for a laser scanning microscope, the detection device (2) having a light inlet (4), at least one filter module (14) and at least one spatially resolving detector (22) and being configured to guide light from the light inlet (4) to the filter module (14) and from there to the spatially resolving detector (22), at least one filter module (14) being designed as a continuous filter module with two continuously tunable filter elements (16), and at least one compensator element (26) being arranged optically downstream of the continuous filter module (14), by means of which a focal position of light on the spatially resolving detector (22) can be adjusted.

16 Claims, 5 Drawing Sheets

(56)          References Cited

U.S. PATENT DOCUMENTS

Figure 1:
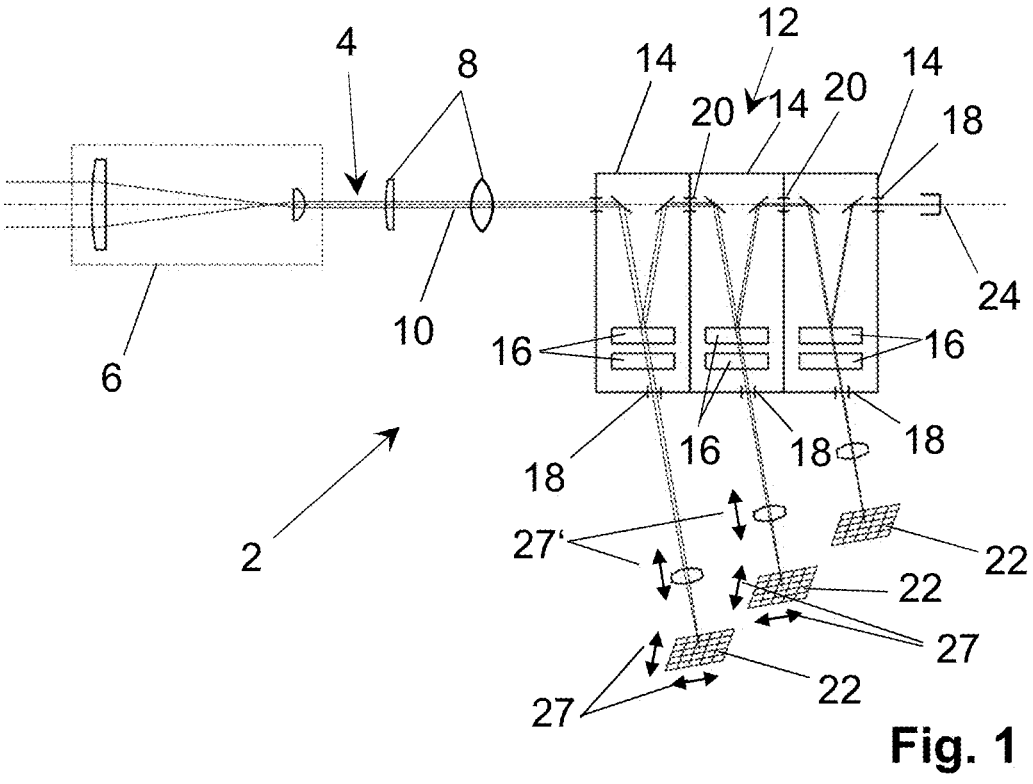

| | | | |
|---|---|---|---|
| 2004/0080818 A1 | 4/2004 | Olschewski | |
| 2004/0098205 A1 | 5/2004 | Olschewski | |
| 2005/0017197 A1 | 1/2005 | Ulrich | |
| 2005/0024637 A1 | 2/2005 | Olschewski | |
| 2005/0046835 A1 | 3/2005 | Olschewski | |
| 2005/0046836 A1 | 3/2005 | Olschewski | |
| 2005/0109949 A1 | 5/2005 | Olschewski | |
| 2007/0076232 A1 | 4/2007 | Olschweski | |
| 2008/0024782 A1 | 1/2008 | Wolleschensky | |
| 2010/0188741 A1 | 7/2010 | Danckwerts | |
| 2011/0317258 A1 | 12/2011 | Wolleschensky | |
| 2014/0312212 A1 | 10/2014 | Schappacher | |
| 2015/0085099 A1 | 3/2015 | Kleppe et al. | |
| 2015/0205086 A1* | 7/2015 | Kitagawa | G02B 21/0032 |
| | | | 250/216 |
| 2017/0350763 A1 | 12/2017 | Shafer et al. | |
| 2018/0203172 A1* | 7/2018 | Gugel | G02B 5/288 |
| 2018/0356344 A1 | 12/2018 | Yi | |
| 2021/0165198 A1 | 6/2021 | Mueller-Rentz et al. | |

FOREIGN PATENT DOCUMENTS

| | | |
|---|---|---|
| DE | 102 13 187 A1 | 10/2003 |
| DE | 102 27 111 A1 | 12/2003 |
| DE | 102 50 100 A1 | 5/2004 |
| DE | 102 50 503 A1 | 5/2004 |
| DE | 10 2004 029 733 A1 | 2/2005 |
| DE | 103 35 471 A1 | 3/2005 |
| DE | 103 39 312 A1 | 3/2005 |
| DE | 103 39 311 A1 | 4/2005 |
| DE | 103 55 150 A1 | 6/2005 |
| DE | 10 2004 004 115 A1 | 8/2005 |
| DE | 10 2006 034 908 A1 | 1/2008 |
| DE | 102 18 706 B4 | 2/2008 |
| DE | 10 2014 116 782 A1 | 5/2016 |
| DE | 10 2009 012 874 B4 | 8/2017 |
| DE | 10 2018 124 129 A1 | 6/2019 |
| DE | 10 2018 129 833 B4 | 1/2020 |
| DE | 10 2018 126 232 B3 | 3/2020 |
| WO | 2015/022147 A1 | 2/2015 |

* cited by examiner

DETECTION DEVICE FOR A LASER SCANNING MICROSCOPE

The invention relates to a device for a laser scanning microscope, the detection device having a light inlet, at least one filter module and at least one spatially resolving detector, and being configured to guide light from the light inlet to the filter module and from there to the spatially resolving detector.

Laser scanning microscopes are known from the prior art. For example, a special form of laser scanning microscope is used for so-called "image scanning microscopy". This refers to a method of fluorescence microscopy in which fluorophores arranged in a biological sample, for example, are excited to glow by means of focused excitation radiation, in particular by a laser beam. During this process, the focused excitation radiation is guided over the sample in a raster pattern and thus only excites the fluorophores present to glow in a spatially narrowly limited area. For each grid point, fluorescence emission is detected by a confocal detector, which is spatially resolved, unlike detectors used in conventional laser scanning microscopy. Consequently, a partial image of the sample is detected at every grid point by the corresponding microscope, wherein the overall image can be calculated from the totality of these partial images. The overall image resolution that can be achieved is especially dependent on the quality of the depiction of the individual partial images on the spatially resolving detector and is higher than the resolution of a conventional confocally recorded image. In this context, image scanning microscopy thus refers to any form of laser scanning microscopy with spatially resolving detection of the fluorescence emission at each grid point, including STED microscopy (STED: stimulated emission depletion) using a spatially resolving detector, for example.

In laser scanning microscopes, the use of different filter arrangements during the detection of the fluorescence emission prevents the detection of excitation light or excitation radiation, which could find its way into the detector of the microscope as scattered light, for example. Therefore, filter arrangements are installed in the laser scanning microscopes that filter out the radiation of excitation wavelengths. However, a laser scanning microscope is preferably able to detect the fluorescence radiation of different fluorophores, so that a separate microscope does not have to be used for each fluorophore used. However, different fluorophores have fluorescence radiation of different wavelengths, so that it is advantageous to use different filters in the microscopes in order to be able to react to the different requirements posed by the different fluorophores used in samples.

DE 102 13 187 A1 describes an embodiment in which multiple spectral bands or channels can be captured and detected simultaneously by feeding light reflected from the first movable aperture to another movable aperture. In each case, a portion of the light passes through the aperture and is fed to a detector, which is not, however, a spatially resolving detector. A similar device can be found in DE 10 2104 116 782 A1 in which the light guided through a pinhole aperture can also be spectrally split by a prism and filtered by movable apertures and lenses. The movable apertures, lenses and additional prisms used to further bundle the light of certain wavelength ranges also form a continuous filter module within the context of the present invention. However, the detectors described are not spatially resolving.

In DE 198 35 070 B4, a variable band pass filter is used instead of a prism, the former containing a variable short pass filter and a variable long pass filter. While the short pass filter is permeable to wavelengths that are shorter than a limit wavelength, a long pass filter is permeable to wavelengths that are longer than a limit wavelength. By carefully combining limit wavelengths of short and long pass filters, the desired wavelength ranges can be filtered out. The various short pass filters and/or long pass filters can be designed as individual filters, for example in a filter wheel, wherein the wheel can be rotated to move another filter in the beam path, or as continuous color gradient filters that can be displaced along a longitudinal direction. In this embodiment too, however, the light to be detected is confocally detected by means of a point detector which is guided through a pinhole aperture before reaching the filter. A spatially resolving detection of the fluorescence emission to a grid point is also not possible in this embodiment. Similar devices are known from DE 10 2006 034 908 A1, DE 10 2009 012 874 B4 and DE 10 2018 126 232 B3. In all of these documents, color gradient filters are used as filter elements to spectrally filter light that has been guided through a pinhole aperture, the light then being fed to a detector that is not spatially resolving.

The invention is therefore based on the task of further developing a detection device in such a way that a continuously adjustable spectral filtering can be achieved during simultaneous spatially resolving detection.

The invention solves the task addressed by way of a detection device according to the preamble of claim 1, characterized in that at least one filter module is designed as a continuous filter module with two continuously tunable filter elements and at least one compensator element is arranged optically downstream of the continuous filter module by means of which a focal point of light on the spatially resolving detector can be adjusted.

In the prior art with confocal, non-spatial resolution detection, the size and accuracy of the positioning of the confocal pinhole aperture defines the spatial resolution at which an image of a sample can be captured. The elements arranged downstream of the pinhole aperture and upstream of the detector do not affect the resolution that can be achieved. The use of a spatially resolving detector, for example to increase the attainable resolution of the overall image of the sample, instead of a detector that integrates across the entire surface of the detector fundamentally changes the boundary conditions and requirements concerning the position and type of optical elements that can be arranged in the beam path of the light. Disturbing the spatial distribution and thus the spatial resolution of the light is forbidden if the spatially resolving detector is to be used advantageously.

Therefore, in the prior art it was assumed that the aforementioned arrangements, in which spectral separation does not occur until after the pinhole aperture in the case of confocal, non-spatially resolving detection, cannot be used in image scanning microscopy. In traditional laser scanning microscopy, the lateral and axial spatial resolution of the confocal detection is largely determined by the pinhole aperture. In this type of microscopy, elements arranged downstream in the beam path generally do not affect the spatial resolution. However, this is not the case in image scanning microscopy with spatially resolving detection of the fluorescence emission at every grid point, as all optical elements upstream of the spatially resolving detector have an impact on the spatial resolution of the overall image. In addition, it was assumed that, in particular, color gradient filters known as continuously tunable filter elements influence spatial resolution, as they cause a spatial in homogeneity with regards to the wavelength in the light passing through the filter. Furthermore, mechanical displacements of individual optical components within the beam path, such as those required when using color gradient filters or prism arrangements to create the detection wavelength bands, lead to changes in the optical path and thus in the imaging properties of the detection device in the case of spatially resolving detectors and a desired spatial resolution detection in the region of the diffraction limit. In particular, it results in lateral displacement of the focal position on the spatially resolving detector.

The invention is based on the knowledge that the arrangement of a filter cascade in the beam path of light on its way to a spatially resolving detector has at most a very small effect on spatial resolution. As a result, a color gradient filter can be used. The effects of the mechanical displacements on individual components in the beam path of the light can be compensated by the compensator element, by means of which a position of incidence of light on the spatially resolving detector can be adjusted.

According to the invention, the detection device has at least one filter module, which is designed as a continuous filter module. It features two continuously tunable filter elements, which can preferably be tuned independently of each other. The fraction of incident light fed to the at least one spatially resolving detector is therefore a spectral fraction of the incident light that has an upper and lower limit wavelength. The upper limit wavelength is preferably determined by one of the filter elements and the lower limit wavelength by the other filter element. If the two filter elements can be tuned independently of each other, the difference between upper and lower limit wavelength and therefore the spectral width of the fraction of light guided onto the spatially resolving detector can be adjusted. If the two filter elements can only be jointly tuned, for instance in the case of a pinhole aperture in the beam guide of a light beam that is spectrally split by a prism, the spectral width of the light that reaches the detector cannot be adjusted. Such an embodiment is also covered by the chosen formulation.

At least one of the filter modules is composed of two continuously tunable filter elements. A continuously tunable filter element refers to a filter element that can be used as a short pass filter or a long pass filter and the limit wavelength of which can be continuously, i.e. infinitely, adjusted. A continuously tunable short pass filter thus lets through light with a wavelength that is shorter than the limit wavelength. The limit wavelength can be freely adjusted. In the same way, a continuously tunable long pass filter lets through let with a wavelength that is longer than the limit wavelength, wherein the limit wavelength can also be freely adjusted. The combination of a short pass filter and a long pass filter allows light of a particular wavelength range to be filtered out of a larger spectral range. It is then fed to a detector, preferably the at least one spatially resolving detector.

A continuous filter module with two continuously tunable filter elements can be used as a transmission filter or reflection filter. In the case of a transmission filter, the portion of the light that passes through the two continuously tunable filter elements in transmission is fed to the detector, while in a reflection filter, the portion of the light that reflects off the filter elements is fed to the detector. The use of a transmission filter is advantageous.

When displacing at least one of the two continuously tunable filter elements, it is usually necessary to mechanically move the respective filter element. This can be done by means of a motor, such as an electric motor, or piezo elements to ensure greater accuracy. Regardless of how the movement of the filter element is caused, the filter element must be mounted such that it can move which, due to manufacturing tolerances, manufacturing inaccuracies and play, means that the orientation of the filter element relative to the optical path may change, which may already lead to a shift of the filtered light, i.e. the focal point of the filtered light, on the spatially resolving detector. This can be compensated by the compensator element.

According to the invention, the at least one compensator element is arranged optically downstream of the continuous filter module. This means that the compensator element does not influence the light on its way to the filter module. Consequently, only one component arranged in the beam path downstream of the filter module is moved or otherwise influenced by the compensator element. Alternatively or additionally, the compensator element can also be used to influence the light that has left the filter module.

Preferably, the at least one filter module is part of a filter cascade with at least two filter modules. As a result, it is possible to detect multiple spectral channels, i.e. wavelength ranges, of the light entering the detection device through the light inlet without having to change any settings on the filter cascade or the detection device. The number of channels that can be detected in this way corresponds to the number of filter modules in the filter cascade or the number of filter modules in the filter cascade plus one. Two channels can be detected with a single filter module.

In a preferred embodiment, the at least one compensator element is configured to move the at least one spatially resolving detector. This preferably involves a movement in a plane perpendicular to the optical axis, i.e. a lateral movement. Alternatively or additionally, the movement involves a displacement of the detector along the optical axis, i.e. an axial movement.

Preferably at least one compensator element is arranged between the continuous filter module and the spatially resolved detector. "Between" does not necessarily mean locally or geometrically in between, although these are preferred embodiments. It is only important that the at least one compensator element is arranged optically between the filter module and the detector, i.e. it is configured to influence the light on its way from the filter module to the detector.

Preferably at least one compensator element, especially preferably every compensator element, is designed as a moveable mirror, in particular a tilting mirror, which is further preferably mounted such that it can be tilted about two tilt axes. Particularly preferably, the two tilt axes are perpendicular to each other. It is usually sufficient to adjust the focal position of light, i.e. the position of the point conjugated to the center of the illumination focus in the sample, on the spatially resolving detector in two directions that extend along the detector plane, i.e. perpendicular to the optical axis and optical path. These two directions, referred to as the X direction and the Y direction, which are preferably perpendicular to each other, thus extend parallel to the detector plane. In a preferred embodiment, the at least one compensator element also renders it possible to change the focus of the light striking the spatially resolving detector, i.e. to achieve a displacement of the focal position in the third perpendicular direction, the Z direction. This can preferably be achieved by displacing a lens in the beam path. Such a lens is provided, for example, to focus the light on the detector surface that has been guided from the filter cascade to the spatially resolving detector. In a preferred embodiment, this lens, which may also be a lens arrangement with multiple optical components, especially multiple lenses, is arranged such that it can be displaced along the optical axis, which preferably corresponds to the light path. In this case, the lens is also a compensator element or belongs to the compensator element, as it allows the adjustment of the focal position of light on the spatially resolving detector. The mechanical displacement of individual optical components itself does not cause a displacement of the focal position in the Z direction, or at least it only causes a very small displacement, but the focal position in the Z direction depends on the selection of a detection wavelength band due to chromatic deviations in the imaging properties. With an ordinary laser scanning microscope as it is known from the prior art, the pinhole aperture used is usually adjusted in such a way that it is on average effective for all detection wavelengths bands to be used, but is not perfect, at least not for all bands. The use of a spatially resolving detector means that a pinhole aperture does not have to be used. In combination with a compensator element for adjusting the focal position of light on the spatially resolving detector in the Z direction, an additional adjustment option is provided, which improves imaging quality. The compensator element may comprise multiple different elements, such as a tilting mirror and a displaceable lens, which are, however, preferably not necessarily used to adjust the focal position of the light on the detector in different directions. Multiple compensator elements that act on light from the same filter module are referred to as a compensation device. The various compensator elements of a compensator device can influence the focal position in different directions. Here, it is advantageous for each compensator element to only influence the focal position in one spatial direction. However, it is also possible for individual or all compensator elements of a compensator device to influence the focal position in multiple spatial directions.

Preferably, the compensator element, particularly the movable mirror is located in a pupil of the detection beam path, more preferably in a plane fourier conjugate to the detector plane. The effect of this is that when the mirror is tilted on the detector, only the position of the spot changes, but not the average direction of incidence.

For some applications it is advantageous for the compensator element to be arranged between the filter module and the spatially resolving detector, the arrangement between the two components meaning that the compensator element is located in the beam path of the light that is guided from the filter module to the spatially resolving detector. It is not necessary for the compensator element to be located structurally between the filter module and the detector, as long as it is in the beam path between these two elements.

Preferably, the continuously tunable filter elements are color gradient filters that are arranged such that they can be displaced in a longitudinal direction. They act as short pass filters and long pass filters, wherein different color gradient filters are used for the various types of filter. Both color gradient filters can be displaced along a longitudinal direction. Here, the longitudinal direction corresponds to the direction in which the gradient of the filter also extends. The limit wavelength of such a color gradient filter depends on the position at which the light strikes the color gradient filter. The limit wavelength changes as a result and thus forms a gradient. The color gradient filter is arranged such that it can be displaced along this direction.

In a preferred embodiment, the detection device has multiple detectors. The number of detectors present advantageously corresponds to the number of filter modules, which restricts the number of spectral channels that can be detected without any changes in the microscope set-up. It is therefore advantageous for the number of detectors to be identical to the number of filter modules. Preferably, several of the detectors are designed as spatially resolving detectors. Particularly preferably, all detectors used are spatially resolving detectors.

Advantageously, there is a compensator element upstream of each spatially resolving detector by means of which a position of incidence of light on the respective spatially resolving detector can be adjusted. The compensator elements for the various spatially resolving detectors can be designed to be identical or different to each other. Preferably they can be controlled independently of each other, so that the position of incidence of light on the various spatially resolving detectors can be adjusted separately and independently of each other. In the case of a filter cascade, the light that is fed to the respective detectors passes through a different number of filter elements. In this way, a portion of the light is fed to the first detector once it has passed through the first filter module only. A further portion of the light is fed to a second detector and has already passed through two filter modules. The more mechanically adjustable filter elements are included in these various filter modules, and are adjusted if necessary, the greater the correction, if any, to the position of incidence of the light on the spatially resolving detector that is necessary to achieve and maintain the desired spatial resolution and quality of the images. Therefore, the compensator elements can preferably be controlled and adjusted separately, independently and/or individually.

Each filter module preferably has a detector outlet through which light is preferably guided to at least one detector. In addition, at least each but the last filter module has a filter outlet through which light is guided to another filter module. The last filter module may also have a filter outlet, downstream of which a further filter module can be arranged. This filter outlet of the last filter module can be used as a further detector outlet or it can lead into a beam trap. It has been found to be advantageous if a detector is arranged downstream of each detector outlet in order to capture the light leaving the respective filter module through the detector outlet, to detect it and to feed it to the evaluation.

In one embodiment, the detection device has at least one switching element by which the light from the at least one filter module can be guided to different detectors. The switching element is designed as a tilting mirror, for example. The switching element is configured to guide light from a filter module to various detectors, the light preferably leaving the filter module through a detector outlet and being guided to the switching element. To this end, the switching element can be brought into different positions or states in which the light is guided towards different detectors when, coming from the filter module, it strikes the switching element.

Alternatively or additionally, the switching element allows the light to be guided from multiple filter modules to one detector, preferably a spatially resolving detector. As a result, the number of detectors required, especially spatially resolved detectors, can be reduced. This reduces costs. In this embodiment, the switching element can also be designed as a tilting mirror. Depending on the position of the switching element, i.e. of the tilting mirror in particular, light is guided from different filter modules to the desired detector. Through a single switching element, preferably only light from a single filter module is directed to the detector at a time. With modern switching elements, especially tilting mirrors, rapid switching can be achieved.

The detector arrangement features multiple switching elements, preferably as many switching elements as filter modules. Each switching element is then configured to guide light from at least one filter module to different detectors. If a separate switching element is provided for each of the filter modules, the light leaving the filter modules can be guided to the respective desired detector, wherein this can be selected independently of the selected detector for the light of another filter module.

Alternatively or additionally, at least one switching element is configured to divert the light from multiple filter modules. To this end, the light of the respective filter module is guided through optical elements, such as mirrors, onto the switching element and from there assigned to the respective detector. This reduces the number of switching elements needed. In this embodiment, the choice of detectors to be used for the light from multiple filter modules is not independent.

The switching elements or the switching element make it possible to obtain high-resolution images of the sample in rapid succession in different color channels, for example using different fluorophores, using a spatially resolving detector for each color channel, although there is not a spatially resolving detector assigned only to this module for each color channel or filter module used. This reduces the number of spatially resolving detectors needed. In particular, this is possible for the embodiment of the switching element that enables light to be guided from different filter modules to a single spatially resolving detector. As a result, it is preferably sufficient for the detection device to have a single spatially resolving detector.

The image capturing can then take place, for example, line by line, wherein in a first position of the switching element along a line a first color channel is captured using a first filter module, wherein during a return of the scan unit to the beginning of a line the switching element is switched over, and wherein along a line a second color channel is captured using a second filter module. This pattern can be continued until an image line has been captured for all desired color channels, but at most until an image line has been captured for each existing filter module. Alternatively, it is also possible to switch the switching element at the end of each line and to capture a subsequent line with the reverse scanning direction. The pattern is then repeated, for example in the same order, or alternatively in a different order of the color channels used for a subsequent image line. It is also possible to apply a capturing pattern in which the scan unit scans a new line on each individual cycle, so that the individual color channels are captured in an interleaved manner. Such a capturing pattern is common in laser scanning microscopy, the line spacing being selected in such a way that the distance between the lines of a single color channel is adjusted to the desired resolution of the overall image. Switching elements, for example tilting mirrors with predetermined tilting positions, can be switched into their predetermined switching positions with such high reproducibility that adjustments of the compensator elements assigned to the filter modules only have to be made once in each case after the filter modules have been set to select the detection wavelength bands at the start of a recording to several color channels.

The switching element is designed as a compensator element. In this case, after the filter modules have been set with respect to the detection wavelength bands for each color channel, the switching positions of the integrated switching and compensator element are determined in such a way that after each switching to one of the determined switching positions, an error associated with the filter module used in each case is compensated.

The detection device preferably features an optical device configured in such a way that a waist of an incident Gaussian bundle is located between two adjacent filter modules or within one filter module. Preferably, a beam divergence is reduced. The adjacent filter modules are preferably arranged in the middle or at least in the middle area of the filter cascade. If the filter cascade has four filter modules, for example, the waist is preferably arranged between the second and third filter modules. If the filter cascade has five filter modules, the waist is preferably within the third filter module or between the third and fourth filter modules. In this way, the divergence inevitably present in a Gaussian bundle with a small waist has as small an influence as possible on the filtering of the incident light by the filter cascade.

The smaller the waist of the Gaussian bundle, the greater the divergence. When using continuously tunable filter elements, especially color gradient filters, it is important that the respective light spot formed by the incident light on the respective filter element is as small as possible in order to keep the spatial dependence of the limit wavelength, which the color gradient filter inevitably has, within the light spot as small as possible. An excessively large diameter of the light beam can also result in mirrors that pass the beam within the cascade no longer being able to pass the entire beam, and thus the beam is cut.

If the waist of the Gaussian bundle were placed upstream of the first filter module, for example, the Gaussian bundle would widen more and more as it passes through the filter cascade, so that the light spot would become very large, especially on the last filter module and its filter elements. This arrangement is therefore avoided. The best value for the diameter of the beam waist depends on the exact design of the individual filter modules as well as the number of modules. In a specific arrangement of the applicant, the detection device is operated with a Gaussian bundle whose waist has a diameter of less than 1.5 mm, preferably less than 1 mm.

Positioning the waist in the central area of the filter cascade ensures that the light spot on the first filter modules and their filter elements initially decreases in size as it progresses along the light path until the waist is reached. After the waist, on the other hand, expansion takes place and the light spot becomes larger. Overall, however, the size of the light spot on all continuously tunable filter elements remains within reasonable limits.

Preferably, the detection device has an electrical or electronic control unit arranged to control the compensator element such that a maximum of the radiation detected by the spatially resolving detector or a cantroid of the distribution of the radiation detected by the spatially resolving detector is located at the center on the spatially resolving detector. For example, the electronic control unit may be part of an electronic data processing device, which may be part of the microscope or part of the detector device. Since the spatially resolving detector measures the distribution of the incident light intensity anyway, a manipulated variable can be determined from the detected signal to control the compensator element.

In a preferred embodiment, one, but particularly preferably all, of the spatial resolution detectors are segmented area detectors. These include, for example, pixelated detectors that have several spatially separated individual detectors, such as SPAD arrays (SPAD. Single Photon Avalanche Diode): They are preferably preceded by at least one lens or lens arrangement that is set up to image the incident light onto the detector. The lens or lens arrangement is preferably set up in such a way that the first maximum, the first minimum and the second maximum of the diffraction disk are detected with spatial resolution. Alternatively, the first maximum and the first minimum can also be detected.

The at least one compensator element according to the invention is used in the operation of the detection device as part of a laser scanning microscope to compensate for the displacement of the filtered light caused by the displacement of at least one of the filter elements, i.e. the focal position of the filtered light on the spatially resolving detector. Of course, this should be done as quickly as possible, in particular to avoid unnecessarily delaying the measurement. A laser scanning microscope has at least one light source and an optical system that focuses the light from the light source into a focal area of the sample. This illumination light is the excitation light used to excite fluorophores located in or on the sample. Illumination light is scanned or rastered across the sample by a scanning unit. The fluorophores then emit emission light to be detected. The emission light is fed via the scan unit to the detection device, where it is filtered by the at least one filter module and fed to the at least one spatially resolving detector. In this process, the detector, more precisely a detection aperture of the detector, is arranged confocal to the focal area on or in the sample. This confocality can be disturbed by displacing at least one filter element and is then restored by the compensator element.

For this purpose, it must be determined how the compensator element is to be adjusted to compensate for the disturbance. A device and method by which this can be easily determined are described in the as yet unpublished international patent application number PCT/EP2020/066589. The entire contents of this application are hereby incorporated by reference in the present application.

Determination can be achieved by means of a device for checking confocality, for example, in several steps. The light emitted by the light source is not directed to the sample via the scan unit, but to an auxiliary detector. This detector, or more precisely its auxiliary detector aperture, is arranged in a focal plane and is scanned with the illumination light by adjusting the scan unit. In this process, a first intensity distribution of the illumination light detected by the auxiliary detector is recorded.

In another step, auxiliary light is introduced into the scan unit by means of an auxiliary light source, which is preferably also arranged in the same focal plane as the auxiliary detector and on an optical axis associated with the auxiliary detector aperture, and is fed to the detection device by means of the scan unit. Here, the auxiliary detector aperture and auxiliary light source can be formed from the same element, for example a diode that can be operated both as an emitter and as a receiver, or the end of an optical fiber that is connected via a fiber coupler to both a detector and an illuminant, for example a laser.

Again, by adjusting the scan unit, the detection device, or more precisely its detection aperture, is scanned to detect a second intensity distribution. At least one difference between the first intensity distribution and the second intensity distribution is then detected across the different positions of the scan unit as a measure of confocality error. This error is determined and a manipulated variable for the compensator element derived from it and the compensator element is adjusted to compensate for the error. A combination of auxiliary light source and auxiliary detector aperture is referred to as an auxiliary device in the following. This also applies when the auxiliary detector aperture and auxiliary light source are formed by the same component, for example a diode.

The two steps make it possible to determine a deviation in confocality particularly easily and quickly and to adjust the compensator element appropriately. Since the detection device according to the embodiment examples of the present invention can be set up to detect different spectral ranges, i.e., different colors, it is advantageous if the laser scanning microscope has a plurality of auxiliary devices, each with an auxiliary light source. The various auxiliary light sources each emit, or can at least emit, auxiliary light with mutually different wavelengths. Each auxiliary device also has a respective auxiliary detector aperture that is configured to detect the light of the auxiliary light source of the respective auxiliary device. The auxiliary detector apertures of the various auxiliary devices can therefore detect light with mutually different wavelengths. An arrangement of several such auxiliary devices is therefore easy to achieve because it is not important at which location within a focal plane such a pair is arranged, but only that it is arranged in a focal plane within the scanning range of the scanning unit. If multiple auxiliary devices are present, the method outlined above can also be performed for multiple spectral components, i.e. multiple detection channels simultaneously. Each auxiliary device that has an auxiliary light source capable of emitting auxiliary light and an auxiliary detector aperture capable of detecting this light emitted by the auxiliary light source preferably operates at a predetermined wavelength, and the auxiliary light source and auxiliary detector aperture are tuned to each other with respect to this wavelength, which may also be referred to as the working wavelength of the auxiliary device. If several auxiliary devices are used, they preferably have different working wavelengths The invention also solves the addressed task by way of a laser scanning microscope with a detection device described here.

In the following, a number of embodiment examples of the invention will be explained in more detail with the aid of the accompanying drawings. They show FIG. 1—a schematic representation of a detection device according to a first embodiment example of the present invention, FIG. 2—a section of a detection device according to a further embodiment example of the present invention, FIG. 3—the section from FIG. 2 in a different setting, FIG. 4—a section of a detection device according to a further embodiment example of the present invention and FIGS. 5 and 6—a schematic representation of measured intensities.

Figure 7:
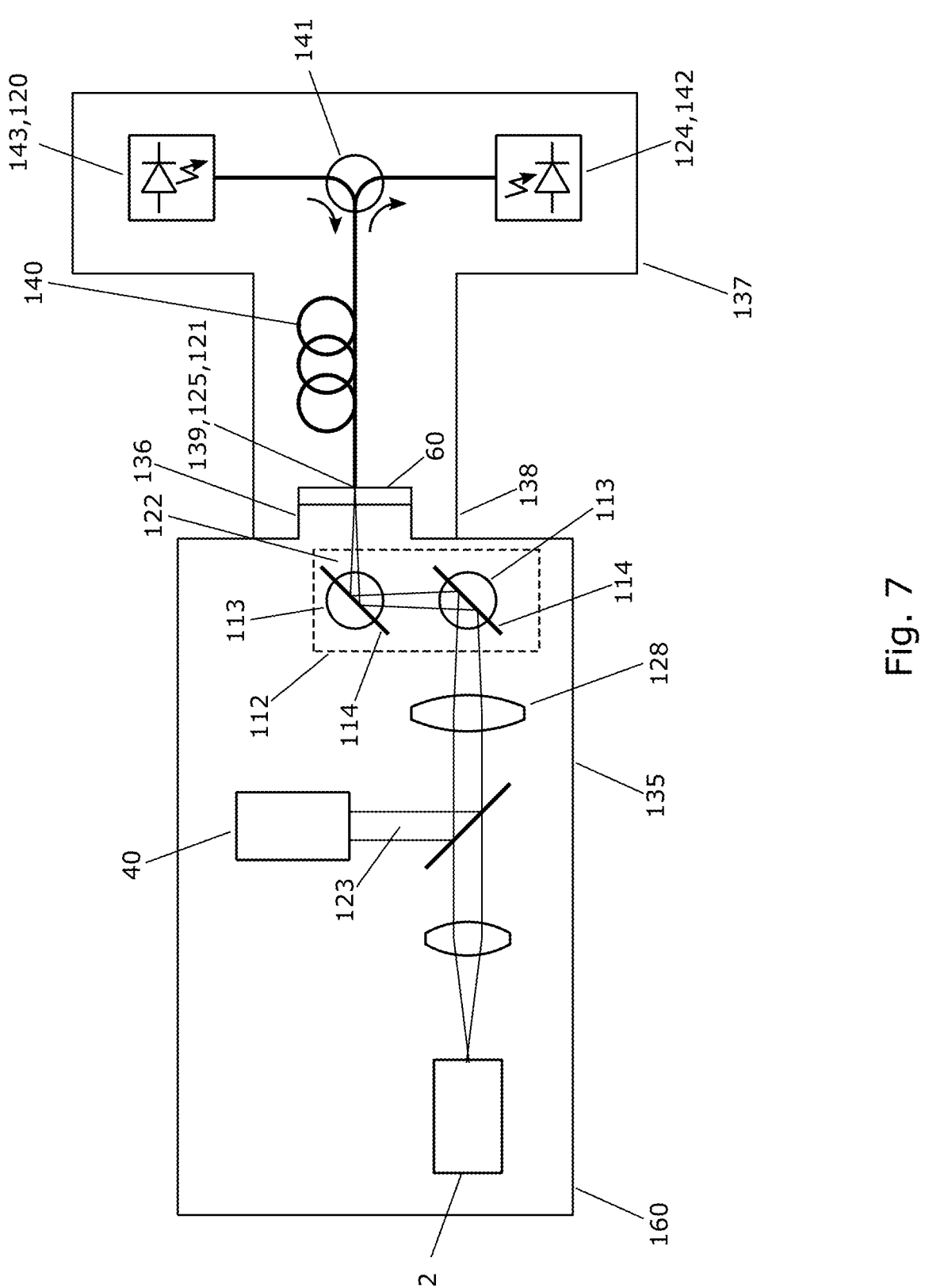

FIG. 7—shows a scanning and descanning microscope assembly with a connected device for checking confocality.

Figure 8:
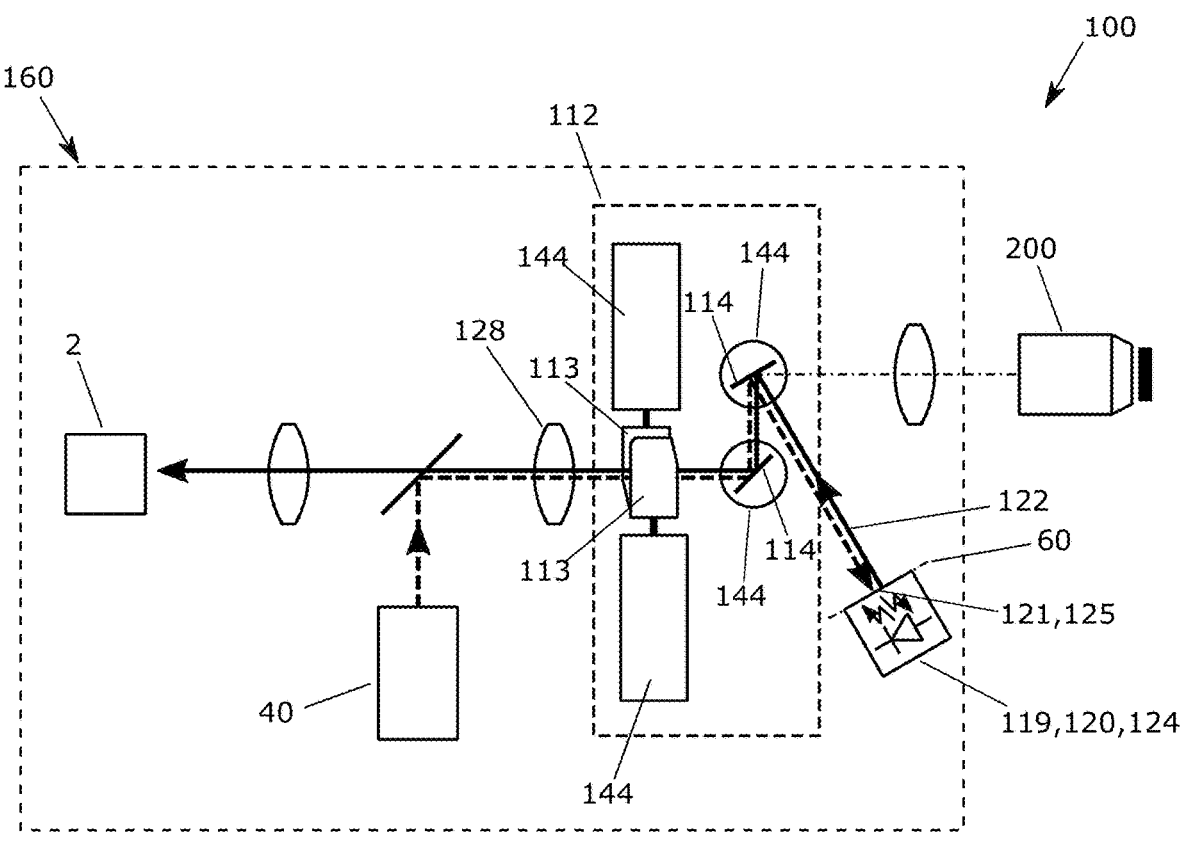

FIG. 8—shows a laser-scanning microscope according to the present disclosure comprising another device for checking confocality.

FIG. 1 schematically depicts a detection device 2 according to a first embodiment example of the present invention. It has a light inlet 4 through which light previously passed through other optical devices 6, of which only one optical device 6 is shown by way of example, enters the detection device 2. A telescope 8 is schematically depicted. Due to the telescope, the waist of the entering Gaussian bundle shifts to the right between the first two filter modules 14 in the embodiment example shown. The detection device 2 has a filter cascade 12, which in the embodiment example shown has three filter modules 14. Each of the filter modules 14 has two filter elements 16 which are continuously tunable and can be designed, for example, as color gradient filters. The first two filter modules 14 shown each have a detector outlet 18 and a filter outlet 20. The portion of the light beam 10 that passes through the two filter elements 16 in the first filter module 14 is guided from the detector outlet 18 to a spatially resolving detector 22. The portion of the light beam 10 which is reflected at the first of the filter elements 16 in the first filter module 14 is guided out of the filter outlet 20 to the next filter module 14. The last filter module 14, which is shown on the far right in FIG. 1, has two detector outlets 18, since the light emerging in each case is not fed to a further filter module 14, but to a detector designed as a spatially resolving detector 22 and a beam trap 25. Compensator elements 26, not shown in FIG. 1, are provided optically downstream of the filter elements 16 of a filter module 14, wherein said compensator elements can be assigned to the respective detectors 22, 24 and used to change a focal position of the light on a detector 22, 24. For example, a compensator element 26 can be used to displace an imaging lens 32 perpendicular to the beam direction, with the displacement, shown in the figure by shift arrows 27', adjusting the focus position in the Z direction. Other compensator elements cause displacement, shown in the figure by displacement arrows 27, in the X direction and in the Y direction. For the sake of clarity, only two of the three filter modules 14 are assigned displacement arrows 27, 27' in FIG. 1. Corresponding compensator elements 26, not shown, are also assigned to the third filter module. In this way, sufficient compensation can be achieved.

Figure 2:
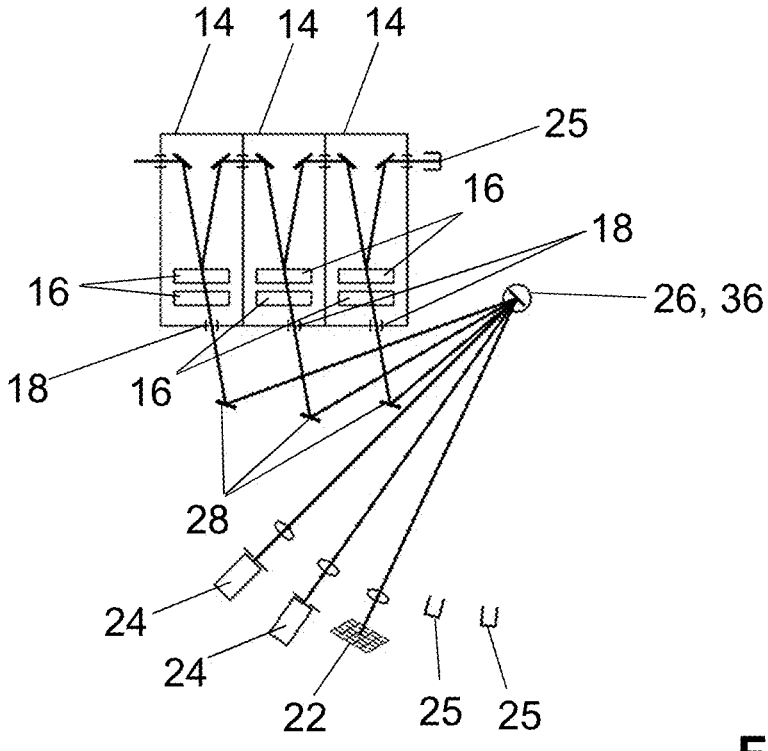

FIG. 2 shows a schematic section of a detection device 2 and depicts three filter modules 14, each with two filter elements 16. Through the detector outlets 18 pointing downwards in FIG. 2, a portion of the light leaves the respective filter module 14 and is guided onto a mirror 28. This mirror 28 reflects the portion of the light onto the compensator element 26, which in the embodiment shown is designed as a movable mirror. It is also a switching element 36.

In the setting depicted, the switching element 36 guides the light that has left the first filter module 14 through its detector outlet 18 to the spatially resolving detector 22, and guides the light that has left the detector outlets 18 of the second and third filter modules 14 to non-spatially resolving collection detectors 24.

Figures 3, 4:
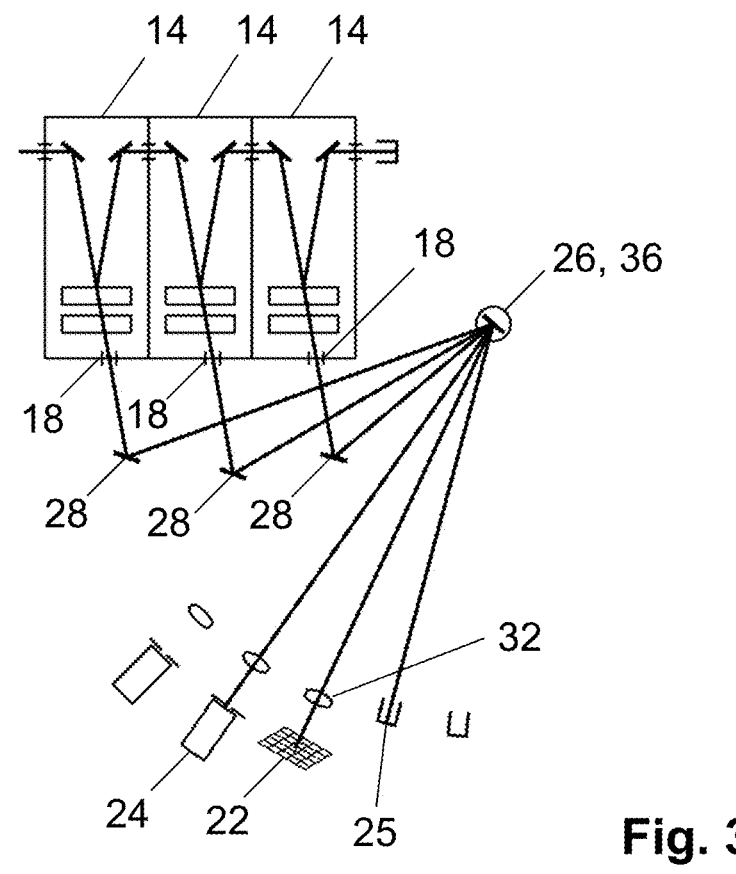

In one setting, shown in FIG. 3, the switching element 36 guides light that has left the second filter module 14 through its detector outlet 18 onto the spatially resolving detector 22 and guides light that has left the first filter module 14 through its detector outlet 18 into a beam trap 25, while guiding light that has left the third filter module 14 through its detector outlet 18 onto the collection detector 24 adjacent to the spatially resolving detector 22.

In a third setting, not shown, it guides light that has left the third filter module 14 through its detector outlet 18 onto the spatially resolving detector 22, while guiding remaining light into a beam trap 25, respectively. In this case, the switching element 36 also serves as a compensator element 26. This means that the fixed setting of the switching element 36 in the event of a change in the selected detection wavelength band, i.e. in the event of a change in the setting of the filter module 14 respectively assigned to the spatially resolving detector 24, is such that an error in the focal position of the light on the spatially resolving detector 22 is compensated. An adjustment with respect to the positions of the light on the collecting detectors is not possible, but also not necessary, since their detection apertures are chosen to be sufficiently large. Thus, in the setting shown in the embodiment, the compensator element 26 is arranged in such a way that the light emerging from the detector outlet 18 of the second and third filter modules is guided to the two collection detectors 24, while the light emerging from the detector outlet 18 of the first filter module 14 is guided to the spatially resolving detector 22. The compensator element 26, which is in the form of a movable mirror, also serves as a switching element 36, each of which is used to guide light emerging from a detector outlet of one of the filter modules 14 to the spatially resolving detector 22. In an alternative embodiment, the mirrors 28 may also each be part of a compensation device comprising two compensator elements 26 designed as two mirrors. The respective mirror 28 may then be used, for example, to achieve compensation in a first direction. The second mirror, i.e. preferably the switching element 36, is used in this case to achieve compensation in a second direction, which is preferably perpendicular to the first direction.

FIG. 3 shows the set-up known from FIG. 2 with the filter modules 14 and their detector outlets 18. The outgoing light is guided to the mirrors 28, from which it is guided to the compensator element 26. This is shown in FIG. 3 in a different position than in FIG. 2. The light from the first filter module is directed into a beam trap 25 and is not available for evaluation. In the beam trap 25, the light is absorbed and thus cannot fall as scattered light on one of the detectors 22, 24. The light from the center filter module 14 is guided to the spatially resolving detector 22 and the light from the right filter module 14 is guided to the collection detector 24. Since the position of incidence of the light on the respective detector 22, 24 is relevant only to the spatially resolving detector 22, a single compensator element 26 is sufficient in the embodiment shown, which has only a single spatially resolving detector 22.

Figure 5:
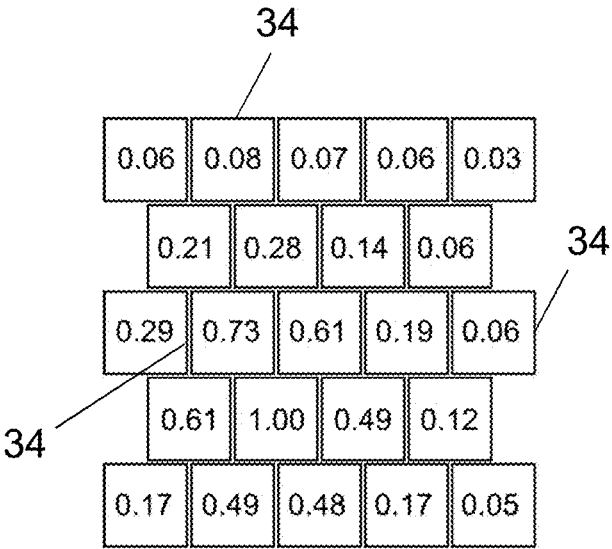
Figure 6:
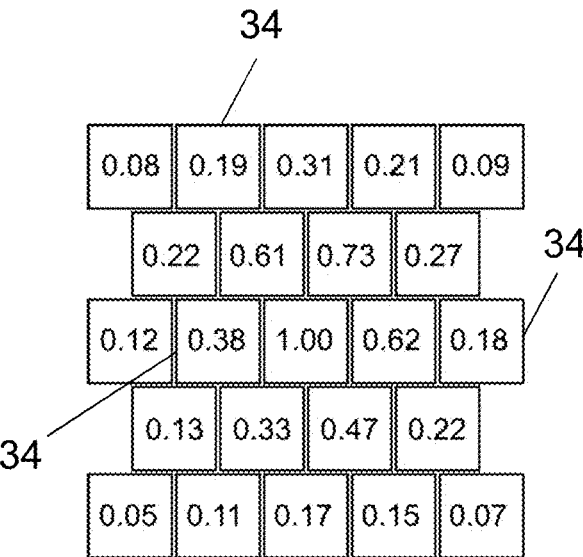

FIG. 4 shows a different embodiment. This also has three filter modules 14, each with two filter elements 16, each of which is designed to be continuously tunable. These filter modules 14 also each have a detector outlet 18 through which light leaves the respective filter module 14 in a downward direction towards a respective spatially resolving detector 22 in FIG. 4. The light leaving through a detector outlet 18 strikes a compensator element 26 in each case and is guided from there through an imaging lens 32 in each case onto the respective spatially resolving detector 22. A switching element 36 is not necessary. FIGS. 5 and 6 show exemplary measured values. Each field 34 corresponds to a pixel of a spatially resolving detector 22. When rastering over a sample, a plurality of sub-images are recorded by the spatially resolving detector 22, each pixel, i.e. each field 34, detecting the incident photons, i.e., in particular, the incident light intensity. The values shown in FIGS. 5 and 6, which are assigned to the the individual fields 34, correspond to the summed intensities over a plurality of captured partial images. Thus, they are measures of intensities integrated over the plurality of images detected by the respective fields 34. The values have been normalized so that the maximum value is 1.00. In an optimally adjusted device, if a large number of photons are detected and a sufficient area of the sample is scanned, a rotationally symmetrical distribution is obtained on average. Such a distribution is not present in FIG. 5, where the maximum value is shifted to the lower left. In FIG. 6, the maximum value is in the middle field 34, but the distribution of values around it is approximately rotationally symmetrical. Deviations from rotational symmetry can be caused by photon noise, by an insufficiently scanned area of an inhomogeneous sample, and by incomplete compensation. In principle, however, the compensation devices and their compensator elements 26 can be adjusted on the basis of such summed intensities so that errors of the focal positions are compensated. The determination of the compensation can be facilitated if during scanning the sample is not only exposed to excitation light, but also to STED light, which in each case suppresses the emission of fluorescence in outer areas of the excitation focus. The effect of this is that fluorescence is emitted only from the near-axis region of the excitation focus, so that each individual detected intensity distribution is rotationally symmetrical to a better approximation. Inhomogeneities in the sample have less effect. In this way, the system, in particular the microscope, can be adjusted and set without the need for a reference sample or a special device to set the confocality.

FIG. 7 does not show a complete laser-scanning microscope, but only a scanning and descanning microscope assembly 160 for such a laser-scanning microscope. This scanning and descanning microscope assembly 160 according to FIG. 7 as such corresponds to the prior art. A scanner 112 comprises a total of four rotating mirrors, two first rotating mirrors 113 and two second rotating mirrors 114, the two first rotating mirrors 113 being assigned to one and the two second rotating mirrors 114 being assigned the other of the two deviation directions of the scanner 112. A scan lens 128 is on that side of the scanner 112 facing towards a light source 40 and the detection device 2. On that side of the scanner 112 facing away from the light source 40 and the detector 2, a connector 136 is formed at a housing 135 or any other supporting structure of the microscope assembly 160 to align the microscope assembly 160 with respect to a corresponding connector and to support the microscope assembly 160 at the corresponding connector, particularly a camera connector of a light microscope comprising an objective lens 200 (see FIG. 8). A device for checking confocality 137 comprising a counter-connector 138 fitting to the connector 136 is supported at the connector 136 in such a way that a terminal cross-section 139 of an optical fiber 140 is arranged in a focal plane 60 into which the illumination light 123 is focussed. Via a fiber optical circulator 141, the optical fiber 140 leads to a photodiode 142 serving as an auxiliary detector 124. Via the same circulator 141, a laser diode 143 is connected to the optical fiber 140 as an auxiliary light source 120. The circulator 141 leads the illumination light entering into the terminal cross-section 139 of the optical fiber 140 exclusively towards the auxiliary detector 124, whereas it leads the auxiliary light 122 from the auxiliary light source 120 exclusively towards to the terminal cross-section 139 of the optical fiber 140. The terminal cross-section 139 of the optical fiber 140 forms an auxiliary detection aperture 125 and an auxiliary emission aperture 121 in the focal plane 60.

In the embodiment of a laser-scanning microscope 100 according to the present disclosure of FIG. 8, the microscope assembly 160 generally corresponds to that one of FIG. 7. However, it is a microscope assembly according to the present disclosure having an integrated photoelectric component 119 which is used as the auxiliary light source 120 and the auxiliary detector 124. Here, no additional beam splitter or deflection mirror is arranged in the main beam path to deflect the illumination light towards the auxiliary detector 124 arranged in a branch and to direct the auxiliary light 122 from the auxiliary light source 120 towards the detector 2, but one of the two second rotating mirrors 114 which are depicted here inclusive of their rotation drives 144 is used for this purpose. The other first rotating mirrors 113 and the second rotating mirrors 114 may then be used for scanning the auxiliary detection aperture 125 of the auxiliary detector 124 and the detection apertures of the detector 2, respectively. The photoelectric component 119 is in a spatially fixed position with respect to the further components of the microscope assembly 160, in which the auxiliary detection aperture 125 and the auxiliary emission aperture 121 are in the focal plane 60 and in which the photoelectric component 119 is accessible with the illumination light via the scanner 112.

REFERENCE LIST 2 detection device
4 light inlet
6 optical device
8 telescope
10 light beam
12 filter cascade
14 filter module
16 filter element
18 detector outlet
20 filter outlet
22 spatially resolving detector
24 collection detector
25 beam trap
26 compensator element
27, 27' displacement arrow
28 mirror
30 absorption element
32 imaging lens
34 field
36 switching element
40 light source
60 focal plane
100 laser-scanning microscope
112 scanner
113 first rotating mirrors
114 second rotating mirrors
119 photoelectric component
120 auxiliary light source
121 auxiliary emission aperture
122 auxiliary light
123 illumination light
124 auxiliary detector
125 auxiliary detection aperture
128 scan lens
135 housing
136 connector
137 device for checking confocality
138 counter-connector
139 terminal cross-section
140 optical fiber
141 fiber optical circulator
142 photodiode
143 laser diode
144 rotation drives
160 microscope assembly
200 objective lens

The invention claimed is:

1. A detection device for a laser scanning microscope, the detection device having
   a light inlet,
   at least one filter module and
   at least one spatially resolving detector
   and being configured to guide light from the light inlet to the filter module and from there to the spatially resolving detector, wherein
   the at least one filter module is designed as a continuous filter module with two continuously tunable filter elements, and at least one compensator element is arranged optically downstream of the continuous filter module, by means of which a focal position of light on the spatially resolving detector can be adjusted wherein the at least one compensator element is arranged between the continuous filter module and the spatially resolving detector.

2. The detection device according to claim 1, characterized in that the at least one filter module is part of a filter cascade with at least two filter modules.

3. The detection device according to claim 1, characterized in that at least one compensator element is designed as a movable mirror.

4. The detection device according to claim 3, characterized in that at least one compensator element is designed as a movable mirror, which is mounted such that it can be tilted about at least two tilt axes.

5. The detection device according to claim 1, characterized in that the continuously tunable filter elements are color gradient filters arranged such that they can be displaced in a longitudinal direction.

6. The detection device according to claim 1, characterized in that the detection device comprises multiple detectors, wherein there are as many detectors as filter modules.

7. The detection device according to claim 6, characterized in that all detectors are designed as spatially resolving detectors.

8. The detection device according to claim 6, characterized in that a compensator element (26) is arranged upstream of every spatially resolving element by means of which a focal position of light on the spatially resolving detector can be adjusted.

9. The detection device according to claim 6, wherein two or more of the multiple detectors are designed as spatially resolved detectors.

10. The detection device according to claim 9, wherein each of the multiple detectors are designed as spatially resolved detectors.

11. The detection device according to claim 1, characterized in that, except for the last filter module, each filter module has a detector outlet through which light is directed onto a detector and a filter outlet through which light is directed onto another filter module.

12. The detection device according to claim 1, characterized in that the detection device comprises an optical device, which is configured in such a way that a waist of an incident Gaussian bundle lies between two adjacent filter modules or within a filter module.

13. The detection device according to claim 1, characterized in that the detection device has an electrical or electronic control unit configured to control the compensator element such that a maximum of the radiation detected by the spatially resolving detector is located at the center on the spatially resolving detector.

14. A laser scanning microscope with a detection device, the detection device comprising:
    a light inlet,
    at least one filter module and
    at least one spatially resolving detector
    and being configured to guide light from the light inlet to the filter module and from there to the spatially resolving detector, wherein
    the at least one filter module is designed as a continuous filter module with two continuously tunable filter elements, and at least one compensator element is arranged optically downstream of the continuous filter module, by means of which a focal position of light on the spatially resolving detector can be adjusted
    wherein the at least one compensator element is arranged between the continuous filter module and the spatially resolving detector.

15. The laser scanning microscope according to claim 14, characterized in that it comprises a device for checking confocality which includes an auxiliary device with an auxiliary light source and an auxiliary detector aperture arranged together in a focal plane on a common optical axis.

16. The laser scanning microscope according to claim 15, characterized in that the device for checking confocality comprises multiple auxiliary devices, the auxiliary light sources of which emit auxiliary light of different wavelengths.

* * * * *